United States Patent
Yue

(10) Patent No.: US 9,280,573 B2
(45) Date of Patent: Mar. 8, 2016

(54) SYSTEM AND METHOD FOR ARRAY-BASED DATA STORAGE AND SEARCH

(71) Applicant: EXERAY INC., Danville, CA (US)

(72) Inventor: Jonathan Zhanjun Yue, Danville, CA (US)

(73) Assignee: Exeray, Inc., Danville, CA (US)

( * ) Notice: Subject to any disclaimer, the term of this patent is extended or adjusted under 35 U.S.C. 154(b) by 233 days.

(21) Appl. No.: 14/107,863

(22) Filed: Dec. 16, 2013

(65) Prior Publication Data
US 2015/0169248 A1    Jun. 18, 2015

(51) Int. Cl.
  *G06F 17/30* (2006.01)
  *G06F 7/00* (2006.01)
(52) U.S. Cl.
  CPC ............ *G06F 17/30312* (2013.01); *G06F 7/00* (2013.01)
(58) Field of Classification Search
  CPC ................................ G06F 7/24; G06F 17/3033
  See application file for complete search history.

(56) References Cited

U.S. PATENT DOCUMENTS

| | | | |
|---|---|---|---|
| 6,470,347 B1 | 10/2002 | Gillam | |
| 6,735,595 B2 | 5/2004 | Gobeille et al. | |
| 2010/0235365 A1* | 9/2010 | Newby, Jr. ................ | G06F 7/24 707/752 |
| 2012/0331257 A1 | 12/2012 | Fulton et al. | |

OTHER PUBLICATIONS

Brodnik, et al., "Resizable arrays in optimal time and space", Department of Computer Science, University of Waterloo, pp. 1-19, (1999).
Sitarski, "HATs: Hashed Array Trees. Fast variable length arrays", Algorithm Alley, (1996).

* cited by examiner

*Primary Examiner* — Jeffrey A Burke
(74) *Attorney, Agent, or Firm* — Sheppard Mullin Richter & Hampton LLP

(57) ABSTRACT

Provided are computer devices and methods for effectively generating and updating a sorted array for quick data access. The array allocates more space than required by the elements it stores. In other words, the array leaves empty spaces between elements such that insertion of a new element only requires the shifting of a small number, or even none, of the existing elements in the array.

14 Claims, 2 Drawing Sheets

SYSTEM AND METHOD FOR ARRAY-BASED DATA STORAGE AND SEARCH

BACKGROUND

Array is a common, useful, and important data structure for computer systems to store and process data. An array is a set of consecutive memory locations grouped under one name, where each individual location is accessed by its index or subscript. It is typically used in computer science to implement static lookup tables to hold multiple values which have the same data type. Sorting an array is useful in organizing data in ordered form and recovering them rapidly.

Elements within a sorted array are found using a binary search, in O(log n); thus sorted arrays are suited for cases when one needs to be able to look up elements quickly. The complexity for lookups is the same as for self-balancing binary search trees.

Inserting and deleting elements in a sorted array, however, is known to be costly. The insertion and deletion of elements in a sorted array executes at O(n). This is due to the need to shift all the elements following the element to be inserted or deleted. In comparison, a self-balancing binary search tree inserts and deletes at O(log n).

For instance, when establishing a new sorted array with n elements, the cost is $O(n^2)$, for inserting all n elements, one-by-one, to the array. When n is large, the cost is prohibitively high and renders regular array useless for storing sorted data elements.

Arrays, however, are simple and have good quality in reference of locality. In modern computer systems, arrays may take advantage of the cache memory to have good performance.

SUMMARY

The present disclosure provides computer systems and methods for creating and using a sorted array that is quick to search and also quick to form and update. The new data structure implemented in the present computer systems and methods is referred to as "Sorted Elastic Array" (SEA). SEA allocates more array cells than actually stored elements but it does not contain all the pointers as in binary search trees or multi-ways trees so it is still memory efficient. More importantly, it improves the insertion operation from O(n) to O(log n).

In one embodiment, therefore, provided is a computer system for inserting an input data element to an array, comprising a processor, memory and program instructions which, when executed by the processor, configure the system to: (a) load an array into memory, wherein the array has a size of B for storing, at a maximum, B data elements, wherein the array contains T data elements, and wherein the data elements are sorted in the array such that any position in the array, if not empty, contains a data element that is greater than all data elements stored in positions on the left and smaller than all data elements stored in positions on the right; (b) identify, in the array, a first data element as the greatest among all data elements smaller than the input data element and a second data element as the smallest among all data elements greater than the input data element, wherein the first and second data elements are adjacent to each other or separated by one or more empty positions therebetween; and (c) (i) if the first and second data elements are located in adjacent positions, shift the first data elements and all adjacent data elements on the left to one position to the left and then placing the input data element in the position vacated by the first data element, or (ii) shift the second data elements and all adjacent data elements on the right to one position to the right and then placing the input data element in the position vacated by the second data element, or (ii) place the input data element in a position between the first and second data elements.

In some aspects, B is at least 20% greater than T. In some aspects, the first and second data elements are separated by at least three empty positions and the input data element is placed in the middle position among the empty positions.

In some aspects, the program instructions further configure the system to, when a ratio f=T/B is greater than a predetermined threshold, enlarge the size of the array to L by allocating memory for L−B additional positions to the array. In some aspects, the predetermined threshold is between 0.5 and 0.9.

In some aspects, the program instructions further configure the system to shift one or more data elements in the array so that empty positions in the array are more evenly distributed.

In some aspects, the program instructions further configure the system to repeat steps (b) and (c) for one or more new input data elements. In some aspects, for different input data elements, both steps (i) and (ii) are carried out.

In some aspects, the program instructions further configure the system to insert into a second index array, at position p, a value i, wherein p is a hash function output of the input data element and i is the position of the input data element in the array. In some aspects, the array and the second index array are of the same length.

In some aspects, the hash function generates a unique non-negative integer value for each data element in the array.

Also provided, in one embodiment, is a computer system for deleting a query data element from an array, comprising a processor, memory and program instructions which, when executed by the processor, configure the system to: (a) access an array that contains T data elements, wherein the array has a size of B for storing, at a maximum, B data elements, and wherein the data elements are sorted in the array such that any position in the array, if not empty, contains a data element that is greater than all data elements stored in positions on the left and smaller than all data elements stored in positions on the right; (d) identify a position in the array for containing a data element equal to the query data element; and (e) mark the position as empty.

In some aspects, the program instructions further configure the system to, when a ratio f=T/B is smaller than a predetermined threshold, shift data elements in the array so that one end of the array has one or more empty positions, and deleting the empty positions from the array, thereby shrinking the size of the array. In some aspects, the predetermined threshold is between 0.1 and 0.7. In some aspects, the number of empty position at the end is at least 10% of B.

BRIEF DESCRIPTION OF THE DRAWINGS

Provided as embodiments of this disclosure are drawings which illustrate by exemplification only, and not limitation, wherein.

Figure 1:
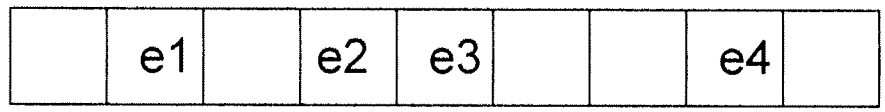
FIG. 1 is a diagram illustrating an array of memory cells containing four data elements and five empty array cells.

It will be recognized that some or all of the figures are schematic representations for exemplification and, hence, that they do not necessarily depict the actual relative sizes or locations of the elements shown. The figures are presented for the purpose of illustrating one or more embodiments with the explicit understanding that they will not be used to limit the scope or the meaning of the claims that follow below.

DETAILED DESCRIPTION

This disclosure provides computer systems and methods that employ a sorted array for quick data access and storage. As provided, the conventional sorted array is costly to update as each insertion of a new element requires shifting of roughly half of the existing elements in the array, depending on where the new element should be inserted. The present technology, however, in one embodiment, provides a sorted array that allocates more space (i.e., positions or cells in the array) than required by the elements it stores. In other words, the array leaves empty spaces between elements such that insertion of a new element necessitates the shifting or a small number, or even none, of the existing elements. Given the ability of such an array to accommodate new elements without the need to increase its size at every insertion, the array is also referred to as a "sorted elastic array (SEA)."

Even with the increased need of memory space, due to the larger size of the array to include empty positions, a SEA still requires much less memory than a binary tree for holding the same number of elements. For instance, suppose a SEA contains T elements but includes B positions (or "spaces," "buckets," "cell" or "slot") for holding elements, and suppose B is about twice as large as T (i.e., B=2T), then the SEA merely needs enough memory space for holding 2T elements. To hold the same number (T) elements, a binary tree would require T nodes plus at least 2×T pointers or references to connect the nodes as a tree; hence the total memory is at least 3T, not counting that pointers can likely take more memory space than a simple data element.

Nevertheless, with the smaller memory space required, search and update of a SEA is as cost-effective as a binary tree, as described in future details below. Therefore, the present technology is superior to binary tree-based technology in terms of memory space requirement and operation efficiency.

The Load Factor

A SEA of the present disclosure, for instance, includes B positions indexed from 0, 1, . . . B−1. At a specific moment, the SEA contains a total number of T actual elements stored, where T<B.

Assuming the T elements are to be randomly distributed to B memory cells. The probability that a memory cell would contain t number of data elements is given by the Binomial distribution:

$$P(t) = \frac{T!}{t!(T-t)!}\left(\frac{1}{B}\right)^t\left(1-\frac{1}{B}\right)^{T-t}$$

When T and B are both large, i.e., T≫1, B≫1, the Binomial probability can be approximated by the Poisson distribution:

$$P(t) \sim = (T/B)^t e^{-T/B}/t! = f^t e^{-f}/t!$$

where f=T/B and is denoted the "load factor," and e is the exponential function.

The statistical mean of t, denoted by E(t), of Poisson distribution is:

$$E(t)=f$$

and the standard deviation is:

$$\sigma(t)=\sqrt{f}.$$

From the above formulas, it can be seen that when the load factor f decreases, the average number of data elements contained in a position decreases too. When the load factor f is 0.5, then on average, every two memory cells would contain just one element and the standard deviation is only 0.71 which is a narrow range.

During an insertion or deletion operation, if the load factor goes beyond (too big or too small) a desired range, the array can be enlarged or shrunk, to maintain an optimal load factor for the array.

Creation of a Sorted Elastic Array and Insertion of Elements

Take an array that contains elements from left to right in ascending order as example. It is understood, however, the direction "left" and "right" impose no limitation as they are used as relative terms for convenience of illustration.

At step 1, a computer system of the present disclosure allocates memory for an initial array of size B, B being a non-zero integer. The system marks all positions in the array as empty.

At step 2, a first element is inserted into any position, preferably the center position, in the initial array.

At step 3, a new element is inserted. First, a binary search is performed in the current array to find the appropriate position, p, for the new element to be inserted at so that order of all the elements in the array is preserved. In other words, the p is right to the element that is immediately smaller than the new element (i.e., greatest among all that are smaller than the new element) and left to the element that is immediately greater than the new element (i.e., smallest among all that are greater than the new element).

During the binary search, the first, last, and midpoint pointers may occasionally point to empty cells. In such cases, move them to the next non-empty positions. Once the right position is found, insert the new element as follows.

If the cell at position p is empty and is flanked by two non-empty positions, each occupied by the two immediately adjacent elements, insert the new element right into position pointed by p.

If the cell at position p is not empty, or in other words, the two immediately adjacent elements occupy positions right next to each other and leave no empty position in between, then the array shifts one of the two elements further down their respective side. Sometimes, either or both of the two elements have no immediately downstream (further down right or left) empty position, such that shifting of either of them will require shifting of all of the immediately downstream elements. In that respect, therefore, the one whose shifting requires the smaller number of shifting of immediately downstream elements is preferred.

Sometimes, the new element may be smaller or greater than all existing element, so that it will be inserted at either end (most left or most right) of the array in any of the empty positions there. Still, the new element is preferably inserted at a position that is at the center of the consecutive empty positions at the end. In some aspects, the new element can be inserted with a gap that has width equal to 1/f (the inverse of the load factor).

During shifting of elements, if the number of elements to be shifted exceeds a predetermined threshold and there exists enough number of empty cells next to these elements, then the array disperses the elements among the empty cells so that there may be gaps (empty position) between the elements. In one aspect, the predetermined threshold is 3, 4, 5, 6, 7, 8, 9, or 10 or is about 1%, 2%, 3%, 4%, 5%, 10%, or 15% of the size (B) of the array.

Figure 3:
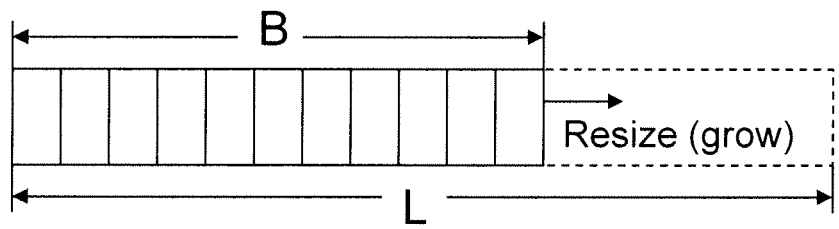
FIG. 3 is a diagram illustrating resizing (growing) an elastic array from length B to length L.

When the number of elements in the current array exceeds a predetermined threshold (determined by the load factor f), the current array can be augmented or replaced by a new array of greater size by allocating more memory. The size of the new array is denoted by L (see FIG. 3), augment factor is denoted by g, so L=gB, where B is the old size. Non-used cells in the new array are marked as empty. In some aspects, the predetermined threshold of f is at least 0.5, or at least 0.5, 0.55, 0.65, 0.7, 0.75, 0.8, 0.85 or 0.9. In some aspects, the predetermined threshold of f is not greater than 0.95, 0.9, 0.85, or 0.8. In some aspects, g is at least 1.1, 1.2, 1.3, 1.4, 1.5, 1.6, 1.7, 1.8, 1.9 or 2. In some aspect, g is not greater than 2.5, 2.4, 2.3, 2.2., 2.1, 2, 1.9, 1.8, 1.7, 1.6 or 1.5.

Figure 4:
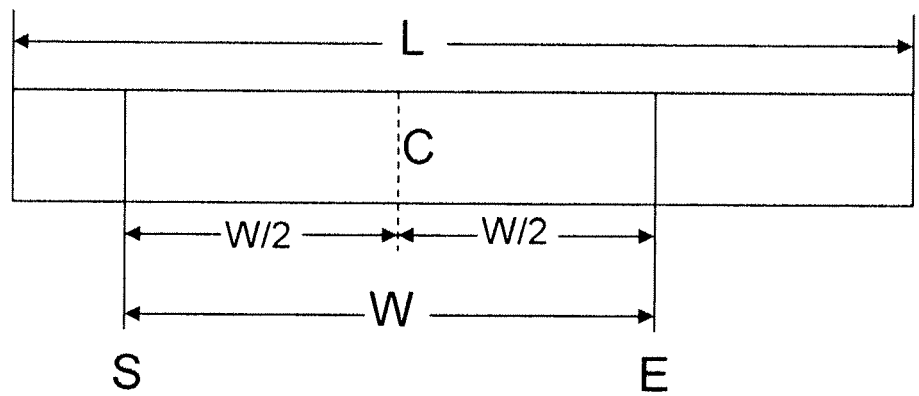
FIG. 4 is a diagram illustrating the dimension and location of data elements after remapping the elements from an old array to a new array.

Once the array is enlarged, it can be remapped so that the elements in the array are more evenly distributed in the new array (see FIG. 4). In some aspects, the remapping procedure starts from the right most element in the array to avoid overwrites and data loss.

Deletion of an Element

Deletion of an element can be implemented by identification of the element at a position and then marking the position as empty. No additional operation, such as shifting, may be needed, as the array of the present disclosure allows empty positions.

In the event the new load factor becomes smaller than a threshold, then elements can be remapped (shifted) to a narrower range, to leave a consecutive number of empty positions at either end of the array. By deletion of these empty positions, the new and shrunk array will have an increased load factor. In some aspects, the predetermined threshold of f is at least 0.1, or at least 0.2, 0.3, 0.4, 0.5, 0.55, 0.65, 0.7, 0.75, 0.8, 0.85 or 0.9. In some aspects, the predetermined threshold of f is not greater than 0.95, 0.9, 0.85, 0.8, 0.75, or 0.7. The size of the new array is denoted by S, augment factor is denoted by g, so B=gS, where B is the old size. In some aspects, g is at least 1.1, 1.2, 1.3, 1.4, 1.5, 1.6, 1.7, 1.8, 1.9 or 2. In some aspect, g is not greater than 2.5, 2.4, 2.3, 2.2., 2.1, 2, 1.9, 1.8, 1.7, 1.6 or 1.5.

The Worst Case Scenario

When creating a new SEA, a worst-case scenario is realized when the input elements are pre-sorted. In such a case, new elements are always added to the right end or left end of the array and eventually the shift operations will dominate and SEA will behave like a regular sorted array. In such a scenario, the cost of insertion is O(N).

To avoid the worst-case scenario, one can maintain an orderliness measurement, namely $\Omega$, to measure the degree of orderliness of the incoming elements. To quantify the measure, let $\Omega=1$ when input elements are in total ascending order; $\Omega=-1$ when input elements are in total descending order; $\Omega=0$ when input elements randomly enters the system. One embodiment of designing the orderliness $\Omega$ is:

$$\Omega=(S_i-S_d)/N$$

where $S_i$ is the accumulative counts that an input element is greater than its preceding input element, and $S_d$ is the accumulative counts that an input element is less than its preceding input element. $\Omega$ takes continuous value in the range $-1<=\Omega<=1$.

With this orderliness parameter, one can modify the insertion method in the random data input case. The goal is that for ascending order elements, the array inserts and remaps existing elements toward the left end of the array and appends new elements toward the right end; for descending elements, it can insert and remap existing elements toward the right end of the array so new elements are inserted toward the left end.

Two control parameters may be used for the modified remapping: one is the span of the newly mapped elements, denoted by W; the other is the position of the center of the mass of all the newly mapped elements, denoted by C.

One embodiment is using a linear model:

Let $W=a|\Omega|+b$ and L be the size of the new augmented array. Notation $|\Omega|$ means the absolute value of $\Omega$. In the case when input elements are in total random order, i.e., $\Omega=0$, W should be equal to L, hence $$L=a|0|+b;$$

so b is solved as b=L.

At $\Omega=1$, i.e., the input elements are in total ascending order, W may be equal to two times the number of elements in the array (one gap exists between adjacent elements):

$$2fB=a+b$$

where B is the size of the old array: L=gB.
One can solve for a: $a=2fB-b=(2fL/g)-L=(2f/g-1)$ L.

Now one can obtain the full expression for W:

$$W=a|\Omega|+b=(2f/g-1)L|\Omega|+L=[(2f/g-1)|\Omega|+1]L$$

For parameter C, a linear model can be used too:
Assume $C=a\Omega+b$
At $\Omega=0$, let C equal to L/2: so b=L/2.
At $\Omega=1$, let C equal to the total elements in the array:

$$C=T=fB=(fL)/g$$

So $a=C-L/2=(2f/g-1)L/2$
Now the full expression for C is:

$$C=[(2f/g-1)\Omega+1]L/2$$

A derived parameter from W and C is the starting position for the newly mapped elements:

$$S = C - W/2$$
$$= [(1-2f/g)(|\Omega|+\Omega)]L/2$$

The ending position of the mapped elements is:

$$E = C + W/2$$
$$= L - [(1-2f/g)(|\Omega|+\Omega)]L/2$$

So for any value of 0, one can spread the elements to the range [S, E] in the new resized array uniformly.

Data Types in an SEA

A SEA of the present disclosure can be used to store any data types that can be sorted. For instance, the data elements in the SEA can be query keys, key and value pairs, or any other types of data. FIG. 1 illustrates a SEA that contains four data elements and five empty positions, with a total of nine positions. The stored elements, e1-e4, can be end data, such as numbers. In some aspect, the data elements stored in the positions are numbers, character strings, or block data, without limitation.

Figure 2:
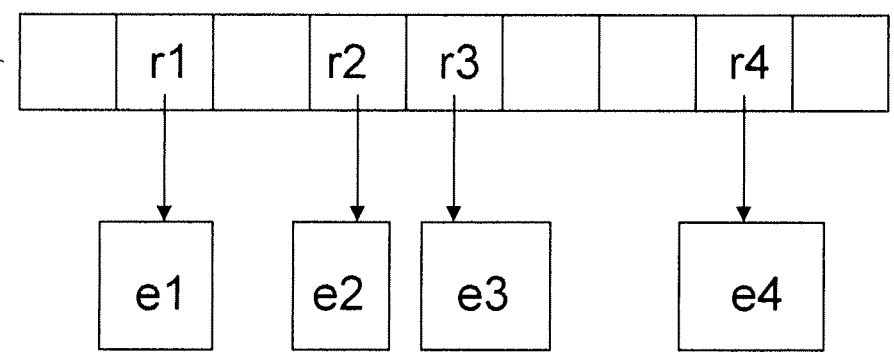
FIG. 2 is a diagram illustrating an array of memory cells containing four references to external data elements and five empty array cells.

In another aspect, the elements can be keys (r1-r4 in FIG. 2) referencing other values (e1-e4). If references are stored, following the reference one can gain access to actual data. Shifting operation may just involve operations on the references, not the actual data.

Look-Up Hash Table (Index Array)

Figure 5:
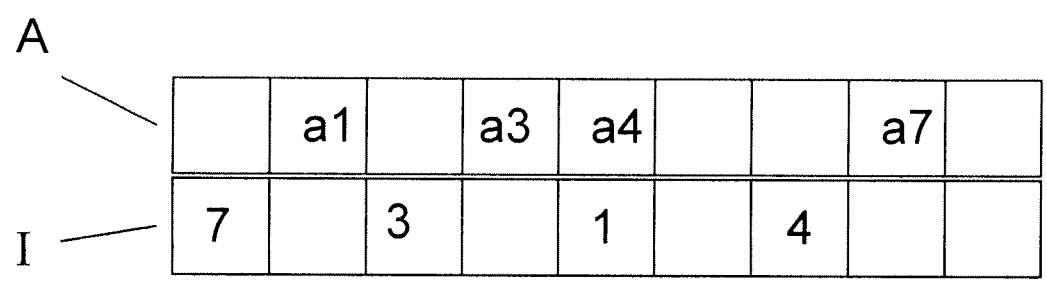
FIG. 5 is a diagram illustrating the data elements in an elastic array and corresponding index hash elements.

A look-up hash table may be maintained for fast key lookup in the array. The size of the hash table is at least as the same size as the elastic array itself (FIG. 5). With the hash table, the elements in the array can be indexed, which can give rise to an O(1) quick access to the elements in the array.

With reference to FIG. 5, an SEA (A) contains four elements, a1, a3, a4 and a7, where the numbers 1, 3, 4 and 7 reflect their positions in the array. An index array (I), is also created in the memory, having a length (i.e., number of slots) $N_I$ that is greater than the number of elements in array A. In one embodiment, the arrays A and I have the same length.

For every element in array A, array I contains at position p an integer i corresponding to the element. Position p is the output of a hash function taking the value of the element as input.

For example, if hash(a7)=0, then p is 0. Then, at position p, what is stored is the position (index) of a7, which is 7.

Therefore, when searching for a7, the computer can (1) first conduct a hash function operation of the a7, getting a result of 0, (2) look into position 0 of array I, getting a value 7, and (3) find a7 at position 7 of array A. As such, no binary search is required, and the cost of such a search is O(1), even much quicker than a conventional array.

To maximize the value of the index array, it is preferred that a hash function is chosen so that the hashed values of all elements in array A are integers between 0 and the length of I−1, and there is no overlap.

In the event multiple elements in array A are mapped to the same position in I, then linear probing may be resorted to resolve the hash collision. When a new element is inserted into array A, a new element is also inserted into the index array, at a position p with a value as explained above.

Such an index array with a corresponding hash function can greatly improve the performance of a SEA. For instance, in an elastic array of size N, an 8 byte reference (addressing type) is used and each reference can refer to a 32 byte data. Suppose one chooses 0.75 as the load factor threshold (f=0.75), and 2 as the augment factor (g=2). The storage size without the hash table is (0.75N×32+8N)=32N. The overhead size of adding the hash table is 8N, giving 8/32=25% extra storage. Considering the O(1) cost benefit of key look-up, in some applications 25% extra memory is warranted.

Computer Systems and Network

The methodology described here can be implemented on a computer system or network. A suitable computer system can include at least a processor and memory; optionally, a computer-readable medium that stores computer code for execution by the processor. Once the code is executed, the computer system carries out the described methodology.

In this regard, a "processor" is an electronic circuit that can execute computer programs. Suitable processors are exemplified by but are not limited to central processing units, microprocessors, graphics processing units, physics processing units, digital signal processors, network processors, front end processors, coprocessors, data processors and audio processors. The term "memory" connotes an electrical device that stores data for retrieval. In one aspect, therefore, a suitable memory is a computer unit that preserves data and assists computation. More generally, suitable methods and devices for providing the requisite network data transmission are known.

Also contemplated is a non-transitory computer readable medium that includes executable code for carrying out the described methodology. In certain embodiments, the medium further contains data or databases needed for such methodology.

Embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to store desired program code in the form of machine-executable instructions or data structures and which may be accessed by a general purpose or special purpose computer or other machine with a processor. Combinations of the above also come within the scope of "machine-readable media." Machine-executable instructions comprise, for example, instructions and data that cause a general purpose computer, special-purpose computer or special-purpose processing machine(s) to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the disclosure also may be practiced in distributed and cloud computing environments where tasks are performed by local and remote processing devices that are linked, by hard-wired links, by wireless links or by a combination of hard-wired or wireless links, through a communications network.

In a distributed computing environment, program modules may be located in both local and remote memory storage devices.

Although the discussions above may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

Unless otherwise defined, all technical and scientific terms used herein have the same meaning as commonly understood by one of ordinary skill in the art to which this disclosure belongs.

The disclosures illustratively described herein may suitably be practiced in the absence of any element or elements, limitation or limitations, not specifically disclosed here. For example, the terms "comprising", "including," containing," etc. shall be read expansively and without limitation. Additionally, the terms and expressions employed here have been used as terms of description and not of limitation; hence, the use of such terms and expressions does not evidence and intention to exclude any equivalents of the features shown and described or of portions thereof. Rather, it is recognized that various modifications are possible within the scope of the disclosure claimed.

By the same token, while the present disclosure has been specifically disclosed by preferred embodiments and optional features, the knowledgeable reader will apprehend modification, improvement and variation of the subject matter embodied here. These modifications, improvements and variations are considered within the scope of the disclosure.

The disclosure has been described broadly and generically here. Each of the narrower species and subgeneric groupings falling within the generic disclosure also form part of the disclosure. This includes the generic description of the disclosure with a proviso or negative limitation removing any subject matter from the genus, regardless of whether or not the excised material is described specifically.

Where features or aspects of the disclosure are described by reference to a Markush group, the disclosure also is described thereby in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

Although the disclosure has been described in conjunction with the above-mentioned embodiments, the foregoing description and examples are intended to illustrate and not limit the scope of the disclosure. Other aspects, advantages and modifications within the scope of the disclosure will be apparent to those skilled in the art to which the disclosure pertains.

The invention claimed is:

1. A computer system for inserting an input data element to an array, comprising a processor, memory and program instructions which, when executed by the processor, configure the system to:
   (a) access an array in the memory comprising an allocated memory space to allow the array to have a size of B for storing, at a maximum, B data elements, wherein the array contains T data elements, and wherein the data elements are sorted in the array such that any position in the array, if not empty, contains a data element that is greater than all data elements stored in positions on the left and smaller than all data elements stored in positions on the right;
   (b) identify, in the array, a first data element as the greatest among all data elements smaller than the input data element and a second data element as the smallest among all data elements greater than the input data element, wherein the first and second data elements are adjacent to each other or separated by one or more empty positions therebetween;
   (c) (i) if the first and second data elements are located in adjacent positions, shift the first data elements and all adjacent data elements on the left to one position to the left and then placing the input data element in the position vacated by the first data element, or shift the second data elements and all adjacent data elements on the right to one position to the right and then placing the input data element in the position vacated by the second data element, or
   (ii) place the input data element in a position between the first and second data elements; and
   (d) enlarge the size of the array in the memory, when a ratio f=T/B is greater than a predetermined threshold, to have L-B additional positions thereby having a total size of L.

2. The computer system of claim 1, wherein B is at least 20% greater than T.

3. The computer system of claim 1, wherein the first and second data elements are separated by at least three empty positions and the input data element is placed in the middle position among the empty positions.

4. The computer system of claim 1, wherein the predetermined threshold is between 0.5 and 0.9.

5. The computer system of claim 1, wherein the program instructions further configure the system to shift one or more data elements in the array so that empty positions in the array are more evenly distributed.

6. The computer system of claim 1, wherein the program instructions further configure the system to repeat steps (b) and (c) for one or more new input data elements.

7. The computer system of claim 6, wherein, for different input data elements, both steps (i) and (ii) are carried out.

8. The computer system of claim 1, wherein the program instructions further configure the system to insert into a second index array, at position p, a value i, wherein p is a hash function output of the input data element and i is the position of the input data element in the array.

9. The computer system of claim 8, wherein the array and the second index array are of the same length.

10. The computer system of claim 8, wherein the hash function generates a unique non-negative integer value for each data element in the array.

11. A computer system for deleting a query data element from an array, comprising a processor, memory and program instructions which, when executed by the processor, configure the system to:
(a) access an array that contains T data elements, wherein the array is stored in the memory comprising an allocated memory space for the array to have a size of B for storing, at a maximum, B data elements, and wherein the data elements are sorted in the array such that any position in the array, if not empty, contains a data element that is greater than all data elements stored in positions on the left and smaller than all data elements stored in positions on the right;
(d) identify a position in the array for containing a data element equal to the query data element;
(c) mark the position as empty
(d) shift data elements in the array so that one end of the array has one or more empty positions, and deleting the empty positions from the array, when a ratio $f = T/B$ is smaller than a predetermined threshold, thereby shrinking the size of the array; and
(e) shrink the size of the array in the memory.

12. The computer system of claim 11, wherein the predetermined threshold is between 0.1 and 0.7.

13. The computer system of claim 11, wherein the number of empty position at the end is at least 10% of B.

14. A method of inserting an input data element to an array, comprising:
(a) accessing, by a computer processor, an array in a computer-readable memory comprising an allocated memory space to allow the array to have a size of B for storing, at a maximum, B data elements, wherein the array contains T data elements, and wherein the data elements are sorted in the array such that any position in the array, if not empty, contains a data element that is greater than all data elements stored in positions on the left and smaller than all data elements stored in positions on the right;
(b) identifying, in the array, a first data element as the greatest among all data elements smaller than the input data element and a second data element as the smallest among all data elements greater than the input data element, wherein the first and second data elements are adjacent to each other or separated by one or more empty positions therebetween;
(c) (i) if the first and second data elements are located in adjacent positions, shifting the first data elements and all adjacent data elements on the left to one position to the left and then placing the input data element in the position vacated by the first data element, or shifting the second data elements and all adjacent data elements on the right to one position to the right and then placing the input data element in the position vacated by the second data element, or
(ii) placing the input data element in a position between the first and second data elements, and
(d) enlarging the size of the array in the memory, when a ratio $f=T/B$ is greater than a predetermined threshold, to have L-B additional positions thereby having a total size of L.

\* \* \* \* \*